(12) United States Patent
Schober

(10) Patent No.: US 9,927,326 B2
(45) Date of Patent: Mar. 27, 2018

(54) DEVICE FOR SENSOR PLACEMENT WITHIN A TIRE FOR REPEATED SENSOR INSERTION AND WITHDRAWAL

(71) Applicants: Compagnie Generale des Etablissements Michelin, Clermont-Ferrand (FR); Michelin Recherche et Technique S.A., Granges-Paccot (CH)

(72) Inventor: Bradley D. Schober, Greer, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 103 days.

(21) Appl. No.: 15/029,406

(22) PCT Filed: Oct. 30, 2013

(86) PCT No.: PCT/US2013/067425
§ 371 (c)(1),
(2) Date: Apr. 14, 2016

(87) PCT Pub. No.: WO2015/065357
PCT Pub. Date: May 7, 2015

(65) Prior Publication Data
US 2016/0231201 A1 Aug. 11, 2016

(51) Int. Cl.
*G01M 17/02* (2006.01)
*B29D 30/00* (2006.01)
*B60C 25/00* (2006.01)

(52) U.S. Cl.
CPC ....... *G01M 17/021* (2013.01); *B29D 30/0061* (2013.01); *B60C 25/005* (2013.01); *G01M 17/022* (2013.01); *B29D 2030/0066* (2013.01)

(58) Field of Classification Search
None
See application file for complete search history.

(56) References Cited

U.S. PATENT DOCUMENTS

| | | | |
|---|---|---|---|
| 3,593,120 A | 7/1971 | Mandula, Jr. | |
| 4,297,876 A | 11/1981 | Weiss | |
| 5,089,077 A | 2/1992 | Byerley | |
| 6,304,090 B1 * | 10/2001 | Weiss | G01M 17/02 324/516 |

(Continued)

OTHER PUBLICATIONS

Extended European Search Report for application 13896449.9-1706 dated Feb. 27, 2017.

(Continued)

*Primary Examiner* — Peter Macchiarolo
*Assistant Examiner* — Jermaine Jenkins
(74) *Attorney, Agent, or Firm* — Dority & Manning, P.A.

(57) ABSTRACT

A device is provided for placing one or more sensors along the inside surface of a tire. The device can accommodate tires of different shapes and sizes as well as projecting features along the inside surface of the tire. In one embodiment, sensors can be inserted into the interior of the tire and simultaneously deployed along the inside surface of both sidewalls. This embodiment of the device allows for repeated insertion and withdrawal of the sensors over a range of tire sizes so as to automate steps in the inspection process.

18 Claims, 9 Drawing Sheets

(56) References Cited

U.S. PATENT DOCUMENTS

| | | | |
|---|---|---|---|
| 6,832,513 B2* | 12/2004 | Weiss | G01M 17/02 |
| | | | 73/146 |
| 6,907,777 B2* | 6/2005 | Weiss | G01M 17/02 |
| | | | 73/146 |
| 7,568,385 B2* | 8/2009 | Maehner | G01B 11/161 |
| | | | 73/146 |
| 8,250,915 B1 | 8/2012 | Voeller | |
| 9,157,834 B2* | 10/2015 | Beccavin | G01M 17/02 |
| 9,555,675 B2* | 1/2017 | Schober | G01M 17/02 |
| 2003/0188574 A1 | 10/2003 | Weiss | |
| 2005/0200838 A1 | 9/2005 | Shaw | |
| 2007/0028679 A1 | 2/2007 | Stoila | |

OTHER PUBLICATIONS

PCT International Search Report for PCT/US2013/067425 dated Mar. 13, 2014.

* cited by examiner

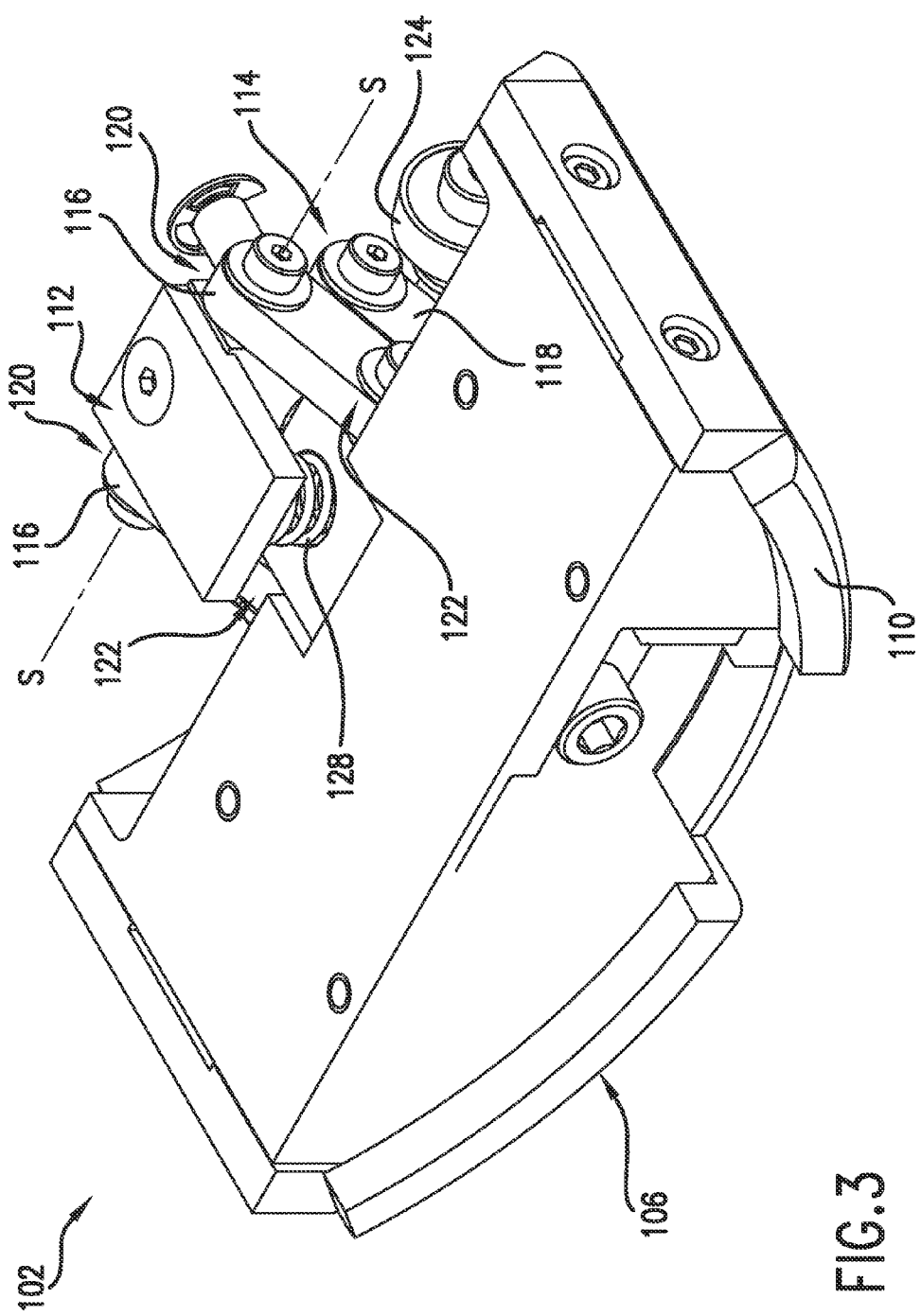

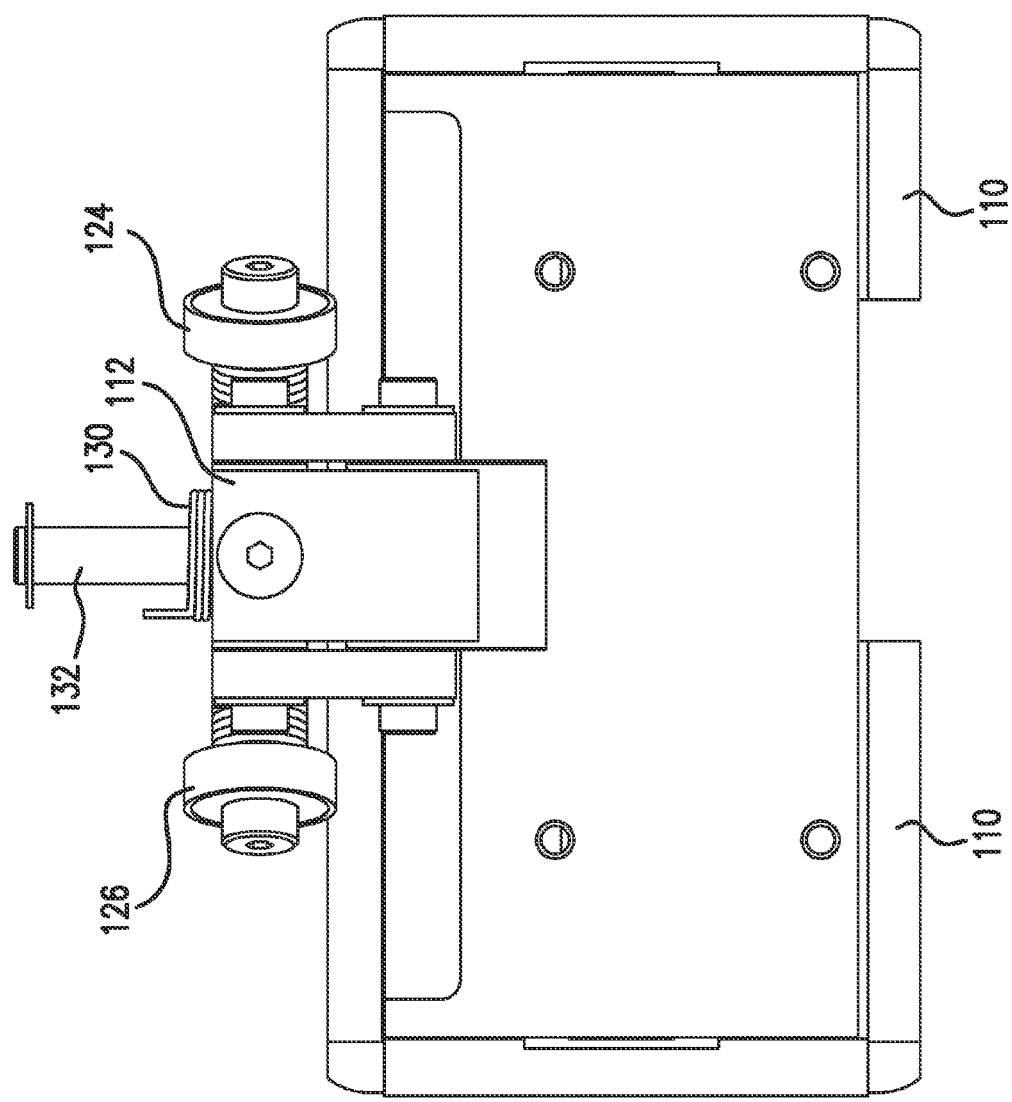

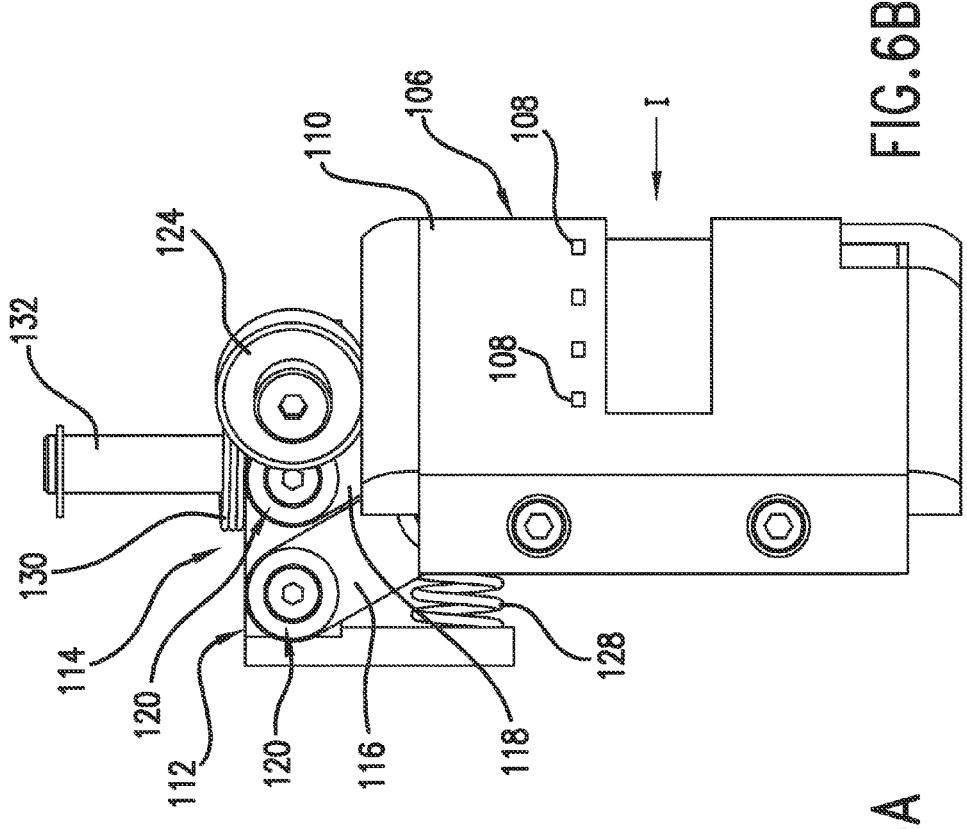
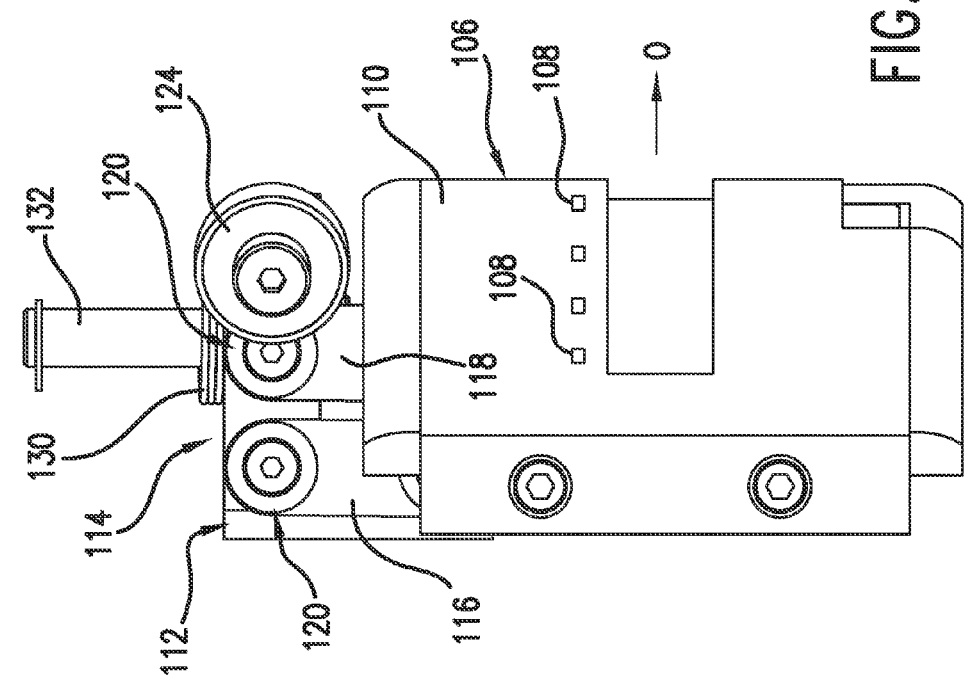
FIG.6A
FIG.6B

DEVICE FOR SENSOR PLACEMENT WITHIN A TIRE FOR REPEATED SENSOR INSERTION AND WITHDRAWAL

FIELD OF THE INVENTION

The subject matter of the present disclosure relates generally to a device for placing one or more sensors inside a tire.

BACKGROUND OF THE INVENTION

In the manufacture, retreading, and use of tires, the temporary placement of one or more sensors along the inside surface of the tire for inspection is useful. Through such inspection, the sensors can be used to obtain important measurements, testing, and other information for both new and used tires. Such information can sometimes be used to determine e.g., whether certain defects and/or damage are present that might not otherwise be visible to the naked eye or obtainable from outside the tire.

By way of example, a known tire construction uses reinforcement cords or support elements that extend from bead to bead through the sidewalls, shoulders, and tread section of the tire. Sometimes referred to collectively as the tire carcass, these cords are typically anchored in the beads and maintain the overall shape of a pneumatic tire as the tire is inflated and used. Such cords are usually oriented substantially along the radial direction (a direction perpendicular to the axis of rotation) through the sidewalls and can include e.g., a ferrous metal.

During use of the tire, these cords may be damaged e.g., from impact with objects in the roadway, travel over curbs, and other damaging events. In some situations, the cords may be completely broken during such an event. Unfortunately, this damage may not be readily discoverable from a visual inspection of the exterior of the tire because the cords are contained within the rubber materials used to construct the tire.

Commercial tires are commonly reused after a process referred to as retreading. With retreading, worn tread is removed from the tire and a new tread belt or tread section is installed onto the tire. Replacement of the tread is less expensive than replacing the whole tire and allows additional mileage to be obtained using the same tire carcass.

Before replacing the tread, however, it is advantageous to inspect the tire, including the cords of the carcass, for damage or wear. In certain situations, inspection may reveal that replacement or other repair of the tire is required rather than retreading. However, as stated above, not all damage to interior elements such as e.g., the cords of the carcass are readily apparent from a visual inspection alone. As the cords for commercial tires such as heavy truck tires are frequently constructed from a ferrous material, one or more sensors can be used to detect cord breaks not otherwise ascertainable from a visual inspection of the tire.

It is desirable to automate inspection processes such as the one described above so that multiple tires may be inspected economically and expediently. Certain challenges are presented for such automation. For example, tires come in a variety of shapes and sizes. The profile and width (along the axial direction) can vary substantially from tire to tire. Some sensors require placement at the inside surface of the tire either in contact with the inside surface or in close proximity thereto. In addition, during certain tire inspections, the tire may need to be rotated during the inspection process so that the sensor(s) can scan the entire sidewall. However, tires may have one or more features along the inside surface of the sidewall such as onboard sensors, patches, and other devices that may project above the inside surface. These features can damage or otherwise interfere with a sensor attempting to scan the inside surface.

Accordingly, a device that can properly position one or more sensors along the inside surface of the tire would be useful. Such a device that can be repeatedly deployed along the inside surface of tires of varying shapes and sizes would also be beneficial. Such a device that can also accommodate features projecting from the inside surface of the tire would be helpful. The ability to deploy one or more of such devices simultaneously along both sidewalls of the tire would be particularly useful.

SUMMARY OF THE INVENTION

The present invention provides a device for placing one or more sensors along the inside surface of a tire. The device can accommodate tires of different shapes and sizes as well as projecting features along the inside surface of the tire. In one embodiment, sensors can be inserted into the interior of the tire and simultaneously deployed along the inside surface of both sidewalls. This embodiment of the device allows for repeated insertion and withdrawal of the sensors over a range of tire sizes so as automate steps in the inspection process. Additional objects and advantages of the invention will be set forth in part in the following description, or may be apparent from the description, or may be learned through practice of the invention.

In one exemplary embodiment, the present invention provides a device for sensor placement within a tire having an inside surface and a pair of opposing sidewalls. The device includes a pair of sensor supports. Each sensor support includes a sensor for positioning along the inside surface of the tire at one of the opposing sidewalls; a substrate upon which the sensor is supported; a bracket; and a plurality of support arms extending between the substrate and the bracket. Each support arm has a first end that is rotatably connected with the bracket and a second end that is rotatably connected with the substrate whereby the substrate can pivot relative to the bracket. A pair of rollers are connected with the bracket and are rotatable relative to the bracket. The rollers are spaced apart from each other and positioned in an opposing manner about the bracket. The pair of rollers are configured for riding along the inside surface of the tire. A biasing element is attached with the bracket and is configured for urging the substrate and sensor towards the inside surface of the tire.

In another exemplary embodiment, the present invention includes a sensor support for placement of a sensor within a tire. The tire has an inside surface and a pair of opposing sidewalls. The sensor support includes a sensor for positioning along the inside surface of the tire at one of the opposing sidewalls, a substrate upon which the sensor is supported, a bracket, and a plurality of support arms extending between the substrate and the bracket. Each support arm has a first end that is rotatably connected with the bracket and a second end that is rotatably connected with the substrate whereby the substrate can pivot relative to the bracket. A pair of rollers are connected with the bracket and rotatable relative to the bracket. The rollers are spaced apart from each other and positioned in an opposing manner about the bracket. The pair of rollers are configured for riding along the inside surface of the tire. A biasing element is attached with the bracket and is configured for urging the substrate and sensor towards the inside surface of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

An exemplary embodiment of a device of the present invention is depicted in FIG. 1 with a side view. The device is shown in a first position outside the tire.

In FIGS. 1 and 2, the arrows U and D denote the directions up and down with respect to the vertical direction V.

FIG. 3 is a perspective view of an exemplary embodiment of a device of the present invention.

FIG. 4 is a rear view of the exemplary device of FIG. 3—i.e., a view from the side opposite to the sensor.

FIG. 6A is an end view of the exemplary device of FIG. 3 in a position the device would assume against an inside surface of a tire.

FIG. 6B is an end view of the exemplary device of FIG. 3—albeit in a position the device would assume when not placed against the inside surface of the tire.

FIG. 8 is a perspective view of another exemplary embodiment of the present invention while

DETAILED DESCRIPTION

Figure 1:
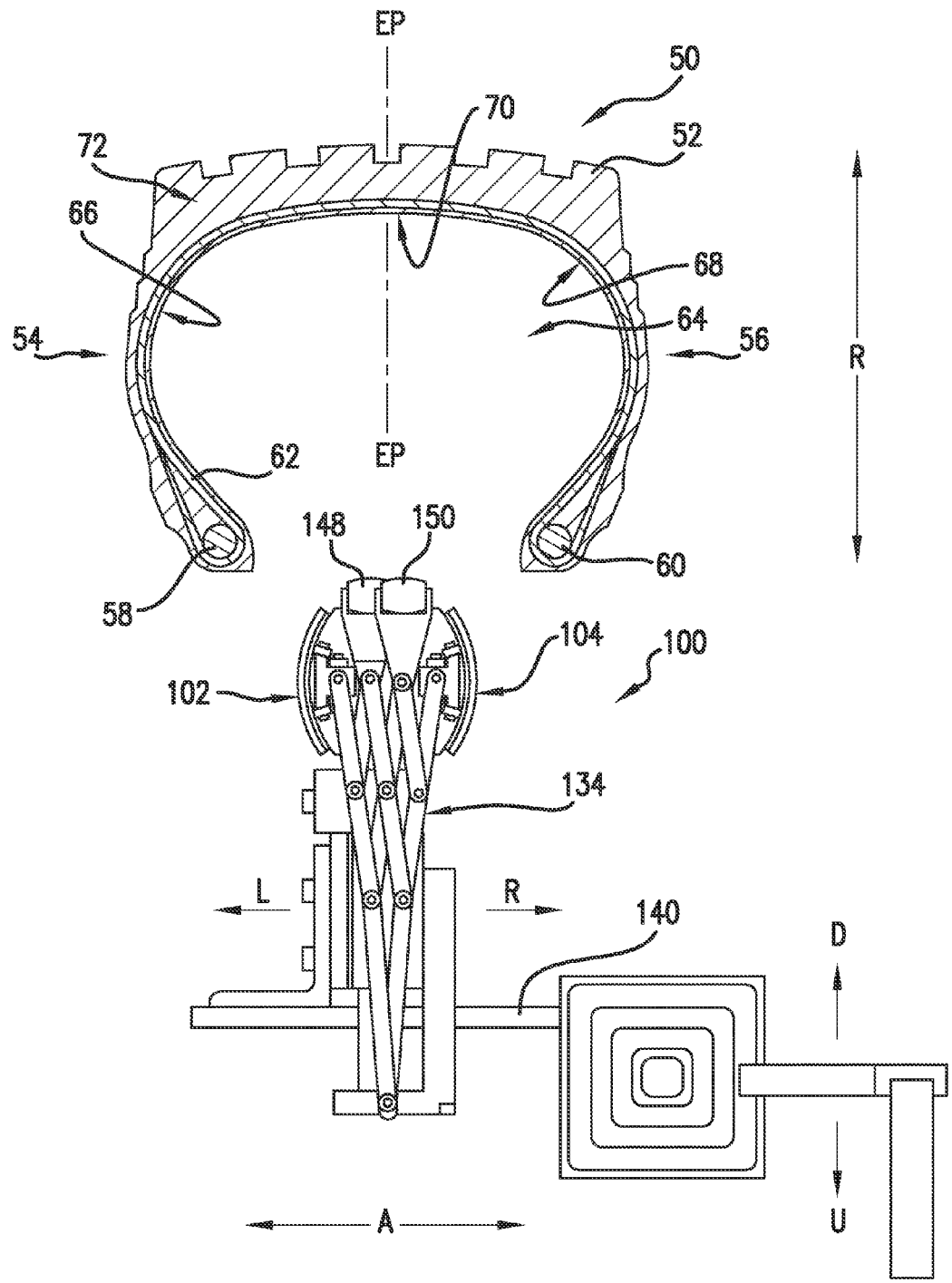
FIG. 1 also provides a cross-sectional view of an exemplary tire as may be used with the present invention.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 2:
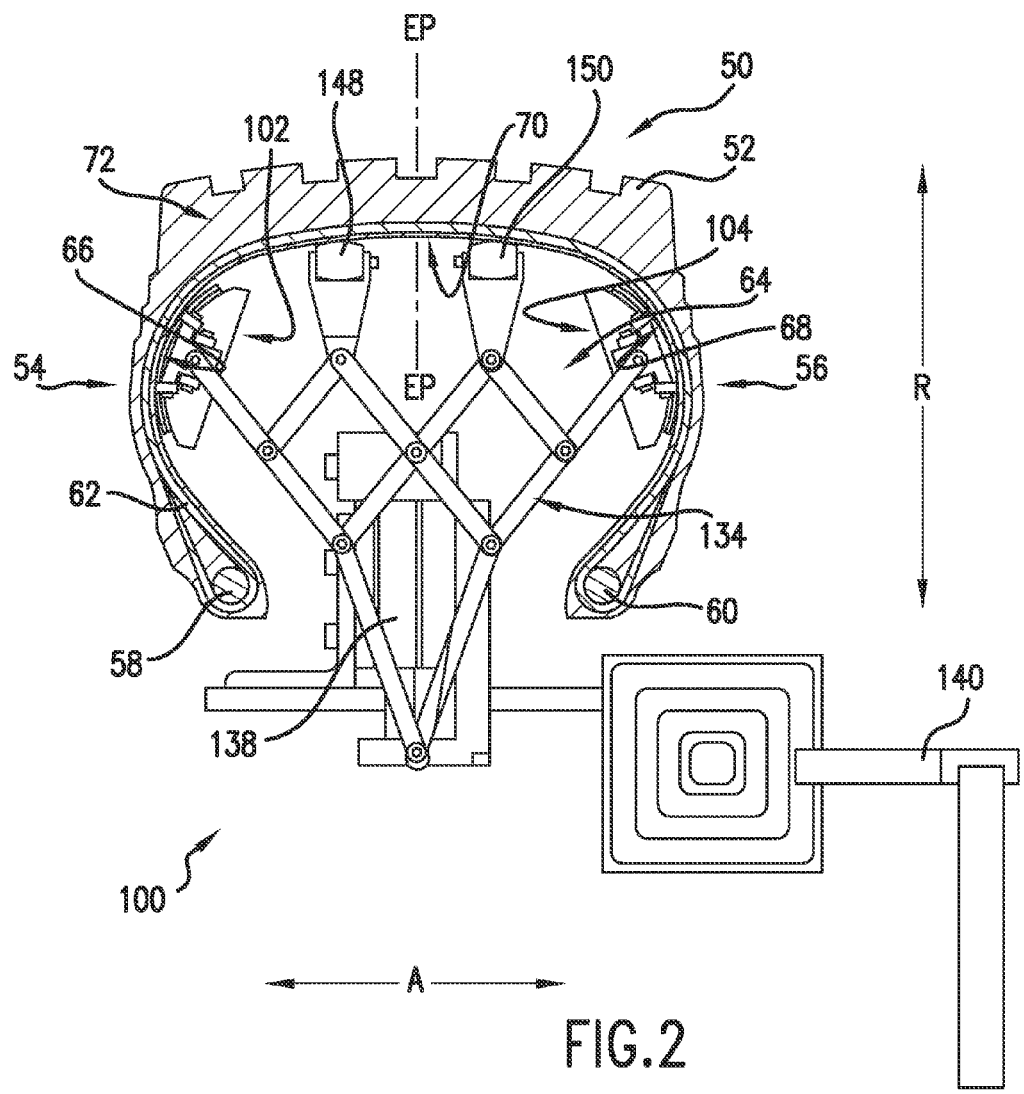
FIG. 2 illustrates the exemplary embodiment of FIG. 1 where the device is shown in a second position inside the tire.
Figure 5A:
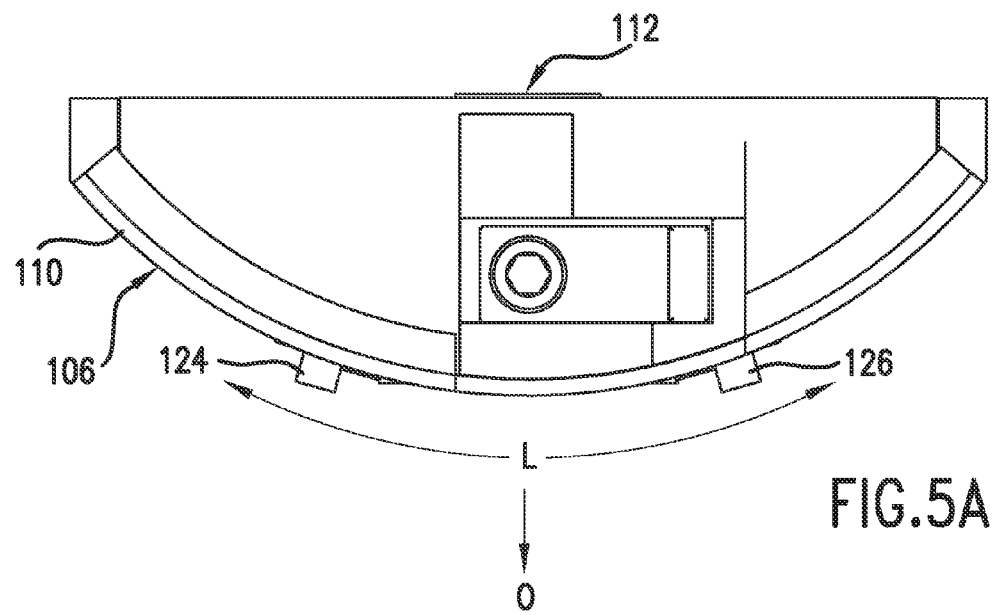
FIG. 5A provides a side view of the exemplary device of FIG. 3 in a position the device would generally assume against an inside surface of a tire.
Figure 5B:
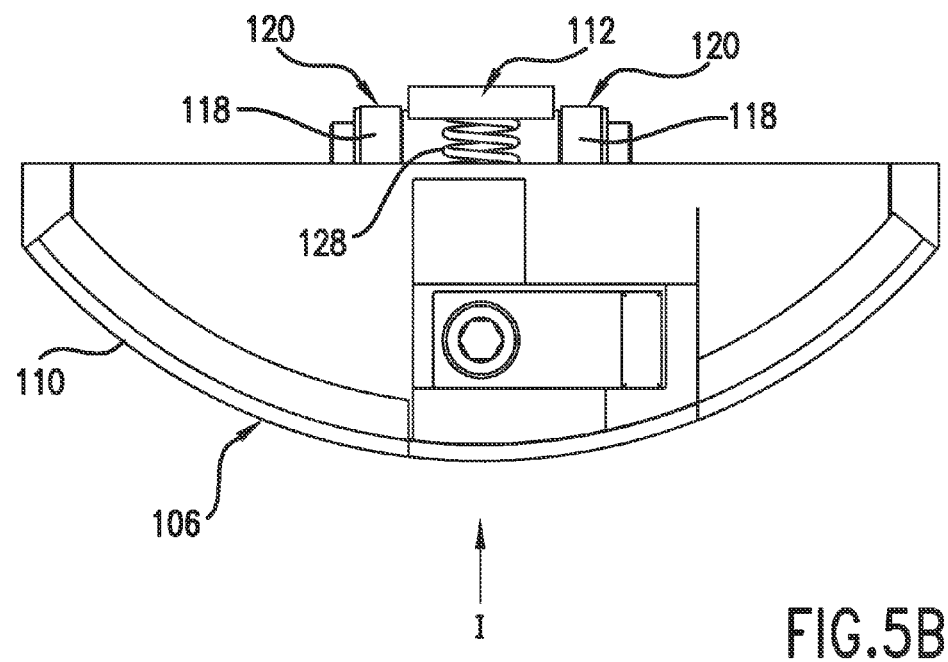
FIG. 5B is also a side view of the exemplary device of FIG. 3—albeit in a position the device would generally assume when not placed against the inside surface of the tire.

FIGS. 1 and 2 depict an exemplary embodiment of a device 100 for sensor placement into the inside 64 of a tire 50. In FIG. 1, device 100 is depicted in a first position in which a pair of sensor supports 102, 104 are adjacent to each other for purposes of insertion or removal from the inside 64 of the tire 50. In FIG. 2, device 100 is positioned in a second position along the inside 64 of tire 50 where sensor supports 102, 104 are spaced apart from each other in an opposing manner to position sensors along a respective inside surface 66 and 68 of tire 50.

Tire 50 is depicted in a cross-section taken along the tire's meridian plane, which is defined herein as the plane that includes the axis about which the tire rotates. The meridian plane is also perpendicular to equatorial plane EP, which bisects tire 50 into two portions along the center of tread portion 52 as shown. Tire 50 also defines a radial direction R and an axial direction A, which is parallel to the axis about which tire 50 rotates. Tire 50 includes tread portion 52 along a crown 72 that extends between sidewalls 54 and 56. A carcass 62 extends through sidewalls 54, 56 to respective beads 58, 60, which are positioned in an opposing manner about tire 50. Tire 50 is provided by way of example only. The present invention may be used with a variety of tire shapes and configurations in addition to that shown in the figures.

The pair of sensor supports 102, 104 are mounted upon a mechanism for positioning the sensor supports 102, 104 inside the tire in an opposing manner as shown in FIG. 2. For this exemplary embodiment, the mechanism is provided as a scissor linkage 134 connected to a frame 140. Once tire 50 is suspended adjacent frame 140 for an inspection, frame 140 can move scissor linkage 134 with sensor supports 102, 104 up and down (arrows U and D) along radial direction R and left and right (arrows L and R) along axial direction A to the position shown in FIG. 1 for insertion into the inside 64 of tire 50. Once lowered (arrow D) to the inside 64 of tire 50, an actuator 138 (FIG. 2) can be used to expand scissor linkage 134 so that the sensor supports 102, 104 are moved into the second position shown in FIG. 2—where sensor supports 102, 104 each position one or more sensors along inside surfaces 66, 68 of respective sidewalls 54, 56. During the inspection, tire 50 may be rotated so as to scan the sidewalls 54, 56. Supplemental rollers 148, 150, supported upon scissor linkage 134 between sensor supports 102, 104, make contact with inside surface 70 in crown 72 for additional stability. Upon completion of the tire inspection, actuator 138 can be used to retract the scissor linkage 134 to a position where the sensor supports 102, 104 are adjacent to each other, whereby the pair can be readily removed from the inside 64 of tire 50 using frame 140.

Various views of sensor support 102 are shown in FIGS. 3, 4, 5A, 5B, 6A, 6B, and 7—it being understood that the construction and operation of sensor support 104 is identical in all important aspects. Sensor support 102 includes a substrate 110 upon which one or more sensors 108 (FIGS. 6A and 6B) may be supported. For example, sensors 108 may be mounted on surface 106 or located just beneath surface 106. Other configurations may be used as well. Sensors 108 are configured for positioning along the inside surfaces 66, 68 of sidewalls 54, 56 of tire 50. Sensors 108 could include, for example, a plurality of Hall Effect sensors used in conjunction with a magnet (not shown) to detect damage to ferrous reinforcements in carcass 62. For this exemplary embodiment, multiple sensors are aligned along a longitudinal direction L (FIGS. 5A and 5B) of substrate 110. Other sensor types and configurations may be used as well.

Figure 7:
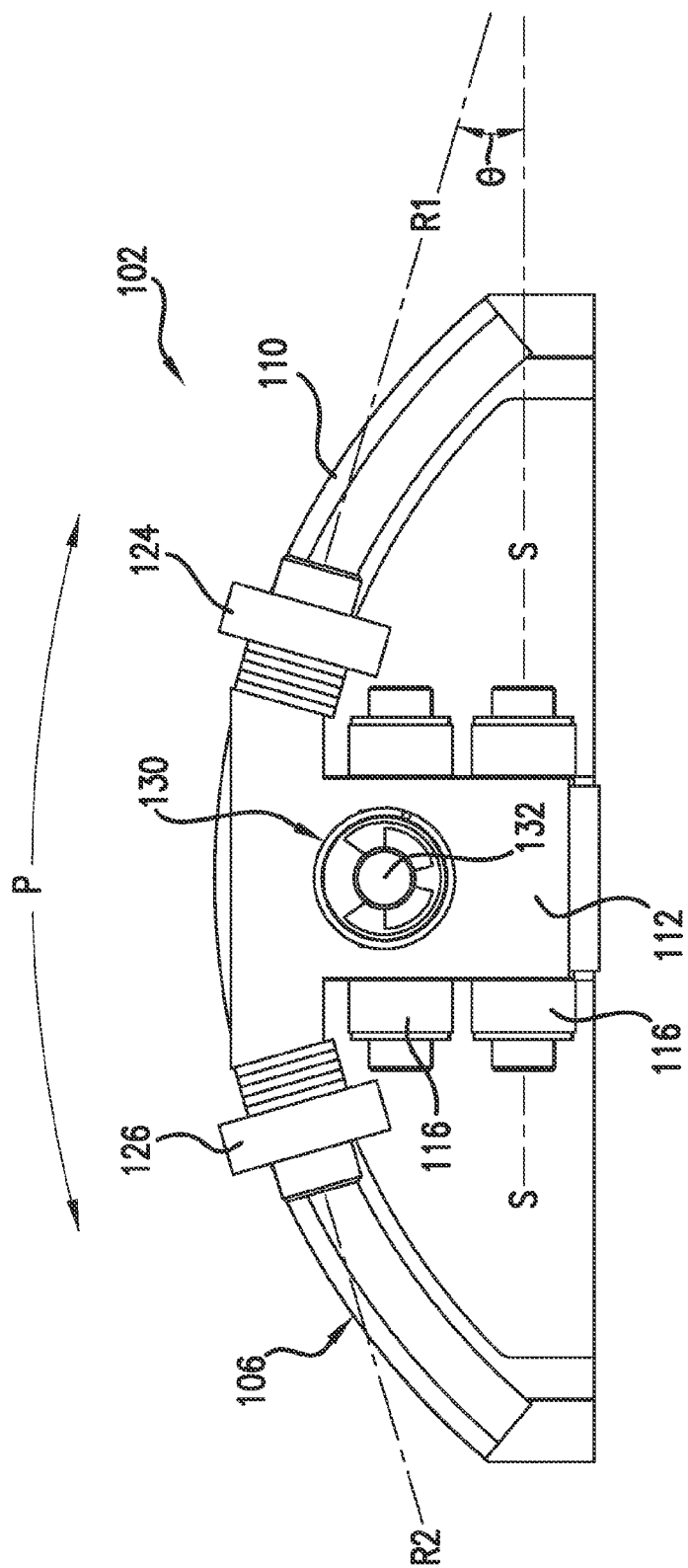
FIG. 7 is a side view—opposite to that shown in FIGS. 5A and 5B—of the exemplary device of FIG. 3.

Substrate 110 is connected with a bracket 112 by a plurality of support arms 114 extending therebetween. For this exemplary embodiment, a first pair of support arms 116 and a second pair of support arms 118 are used. Each pair of supports arms 116, 118 are positioned on opposing sides of bracket 112. Each support arm has a first end 120 that is rotatably connected with bracket 112 and a second end 122 rotatably connected with substrate 110. Each pair of supports 116, 118 is rotatable about an axis. For example, first pair of support arms 116 are rotatable about axis S-S (FIGS. 3 and 7). As such, substrate 110 is pivotable relative to bracket 112.

A pair of rollers 124, 126 are connected with bracket 112 and are rotatable relative to bracket 112. As shown, rollers 124, 126 are spaced apart from each other and are positioned on opposing sides of bracket 112. During inspection of tire 50, rollers 124,126 ride along the inside surfaces 66, 68 of tire 50 as it is rotated past sensors 108. To facilitate this movement, rollers 124, 126 are angled from each other to more closely match the curved insides surface 66, 68 of tire 50. More particularly, as best seen in FIG. 7, roller 124 rotates about an axis R1 while roller 126 rotates about an axis R2. As shown, axis R1 and R2 are non-parallel to each other and also form a non-zero, acute angle θ from axis S-S about which the first end 120 of the first pair of support arms 116 are rotatable. In one exemplary embodiment, angle θ is in the range of about 10 degrees to about 45 degrees. In another exemplary embodiment, angle θ is about 16 degrees. In still another exemplary embodiment, angle θ is about 30 degrees. Other angles may be used as well.

A biasing element 128 is attached with bracket 112 and is configured for urging substrate 110 towards the inside surface of the tire. More particularly, referring back to FIGS. 1 and 2, for this exemplary embodiment biasing element 128 is configured as a compression spring 128 that urges supports 102, 104 towards insides surfaces 66, 68 and away from each other.

Accordingly, when sensor supports 102, 104 are deployed and make contact with the inside surfaces 66, 68, their position shifts. Using sensor support 102 for continued description and example, sensor support 102 will shift (arrow I in FIG. 5B) from a first position shown in FIGS. 5B and 6B, to a second position shown in FIGS. 5A, 6A, and 7. In this second position, substrate 110 with one or more sensors 108 can ride or float (arrows I and O) along the inside surface of tire 50 as it is rotated. Further, rollers 124, 126 will roll along the inside surface of tire 50 to facilitate such movement.

If the sensor support 102 encounters a projection along the inside of tire 50 during such rotation, the pivoting action of supports arms 114 allows the substrate 110 along with sensor(s) 108 to shift position or move (arrows I and O) relative to the inside surface so that sensor support 102 can pass the projection without damage. The action of biasing element 128 will allow support 102 to move away from the inside surface of tire 50 while also urging sensor support 102 back towards the inside surface once the projection or surface anomaly has passed. Adjustments can be made to the force provided by biasing element 128 (such as e.g., using a compression spring of different stiffness) to provide the best amount of pressure, wear, etc. for sensor support 102. The removal of support 102 from contact with inside surface 66 allows support 102 to shift back (arrow O) to the position shown in FIGS. 5B and 6B.

Additionally, each sensor support 102, 104 is rotatably connected with scissor linkage 134. Using sensor support 102 again for example, support 102 is rotatably connected to a linkage arm 132 as shown in FIGS. 2, 6A, 6B, and 7. As such, sensor support 102 can move along directions P as shown in FIG. 7. A torsion spring 130 is supported upon linkage arm 132 and is connected with bracket 112. Torsion spring 130 is configured for urging sensor support 102 to rotate relative to the linkage arm 132.

Referring back to FIG. 1, in this first position, the torsion spring associated with each sensor support 102, 104 causes the supports to assume the position shown where they are adjacent to each other and axis S-S of the respective supports are substantially parallel. Once deployed against the inside surfaces 66, 68 as shown in the second position of FIG. 2, contact with tire 50 operates against the torsion spring and causes each support 102, 104 to rotate into a position determined by the shape of the inside surfaces 66, 68 interacting with the rollers and substrate of each support 102, 104. Once removed from contact with inside surface 66, 68, the torsion springs will cause each sensor support 102, 104 to rotate back in the more compact position shown in FIG. 1 for easier removal from the inside 64 of tire 50. The ability of each sensor support 102, 104 to rotate along the direction of arrow P (FIG. 7) also helps accommodate tires of different shapes and configurations for testing.

Figure 8:
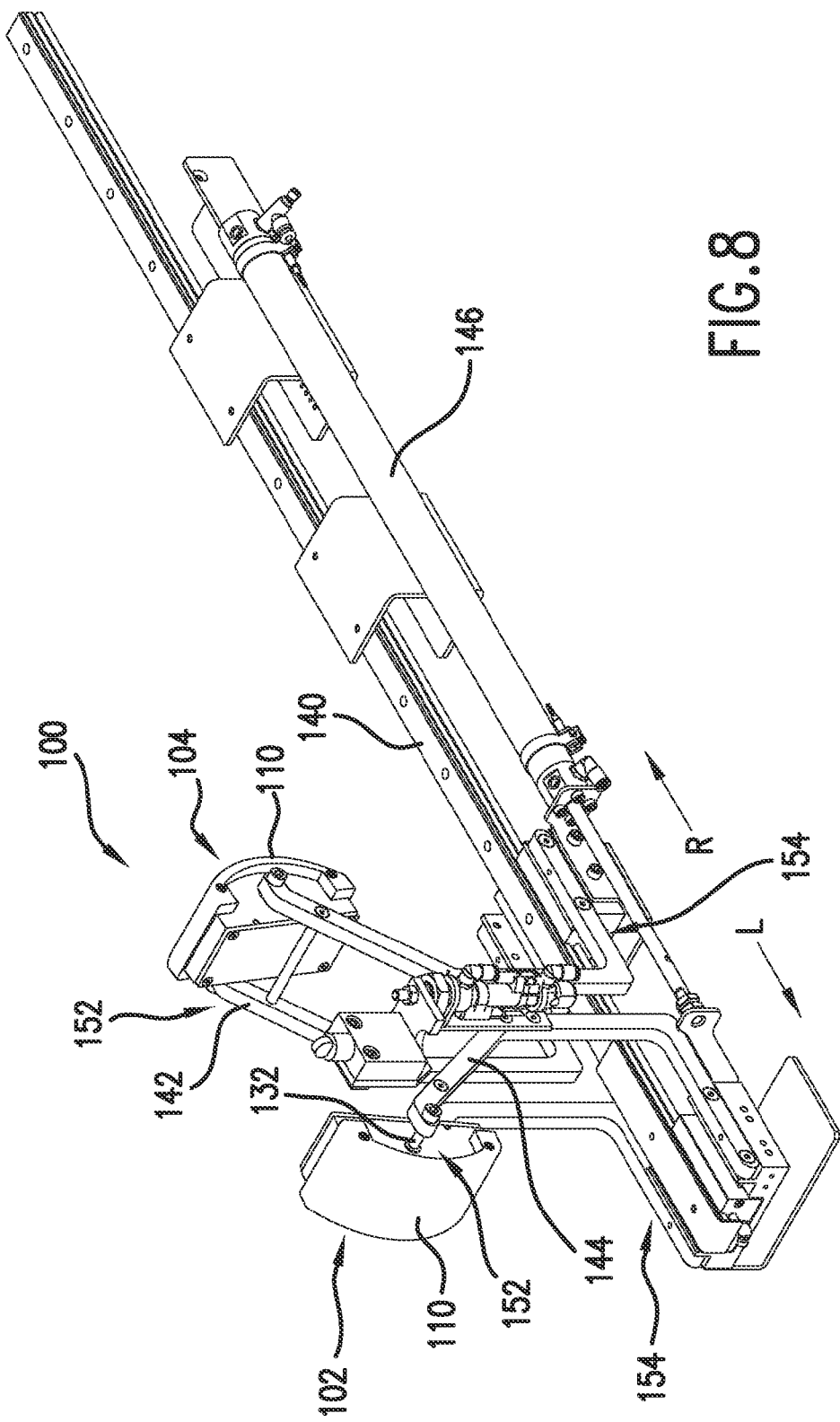
Figure 9:
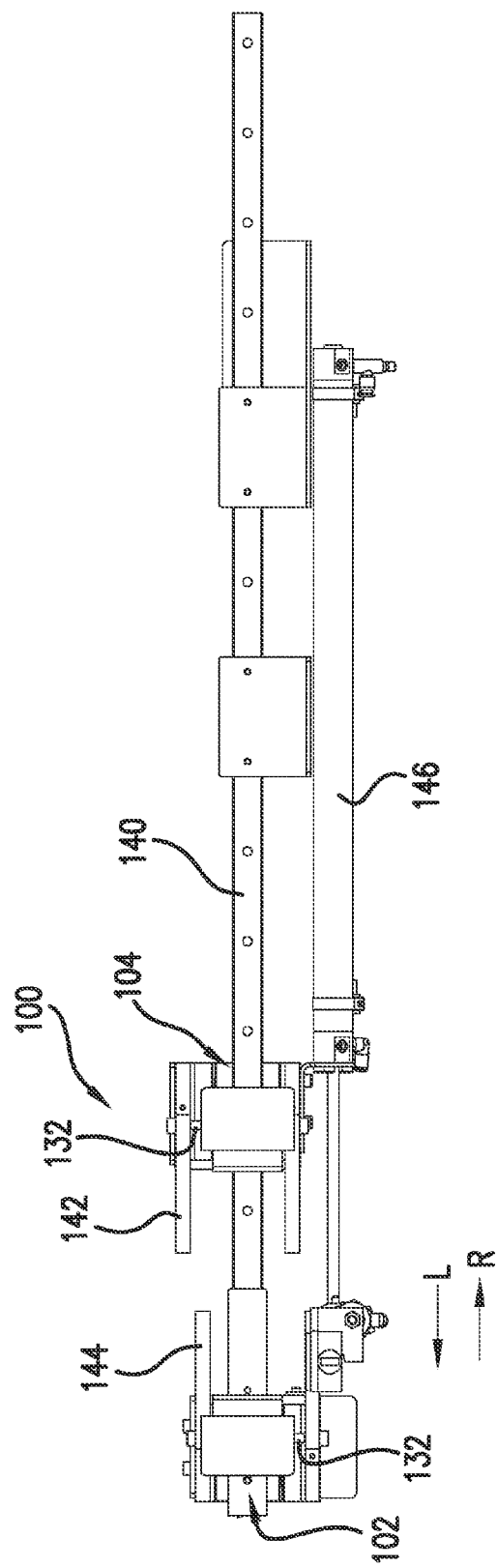
FIG. 9 is a top view of the same exemplary embodiment.

The present invention is not limited to the particular frame 140 with scissor linkage 134 shown in FIGS. 1 and 2 as other frame configurations may be used as well. For example, FIGS. 8 and 9 show another exemplary frame 140 in which sensor supports 102, 104 are rotatably mounted onto a pair of pivot arms 142, 144. Each pivot arm 142, 144 has a distal end 152 and a base end 154. The distal end 152 of each pivot arm 142, 144 is rotatably connected to its respective sensor support 102, 104. An actuator 146 can be used to move arm 142 left and right relative to frame 140 for positioning along the inside 64 of tire 50. The operation and construction of sensor supports 102, 104 is otherwise as previously described. Other constructions for frame 140 and for a mechanism that positions sensor supports 102, 104 inside the tire may be used as well.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art using the teachings disclosed herein.

What is claimed is:

1. A device for sensor placement within a tire, the tire having an inside surface and a pair of opposing sidewalls, the device comprising:
   a pair of sensor supports, each sensor support comprising
      a sensor for positioning along the inside surface of the tire at one of the opposing sidewalls;
      a substrate upon which the sensor is supported;
      a bracket;
      a plurality of support arms extending between the substrate and the bracket, each support arm having a first end that is rotatably connected with the bracket and a second end that is rotatably connected with the substrate whereby the substrate can pivot relative to the bracket;
      a pair of rollers that are connected with the bracket and rotatable relative to the bracket, the rollers spaced apart from each other and positioned in an opposing manner about the bracket, the pair of rollers configured for riding along the inside surface of the tire; and a biasing element attached with the bracket and configured for urging the substrate and sensor towards the inside surface of the tire.

2. The device for sensor placement within a tire as in claim 1, wherein the support arms define a support arm axis about with the first end of the support arms are rotatable, and wherein each roller is rotatable about a roller axis that is offset by a non-zero angle from the support arm axis.

3. The device for sensor placement within a tire as in claim 1, further comprising a pair of linkage arms, wherein each sensor support is rotatably connected to one of the linkage arms.

4. The device for sensor placement within a tire as in claim 3, further comprising a pair of torsion springs, each torsion spring supported upon one of the linkage arms and connected with the bracket of one of the respective sensor supports, each torsion spring configured for urging one of the respective sensor supports to rotate relative to the linkage arm.

5. The device for sensor placement within a tire as in claim 4, further comprising
a scissor linkage connected with the pair of linkage arms, the scissor linkage shiftable between i) a first position in which the pair of sensor supports are adjacent to each other for insertion into the inside of the tire and ii) a second position in which the pair of sensor supports are spaced apart from each other in an opposing manner with each sensor positioned adjacent to the inside surface of the tire along one of the sidewalls.

6. The device for sensor placement within a tire as in claim 5, further comprising an actuator for shifting the scissor linkage between the first position and the second position.

7. The device for sensor placement within a tire as in claim 1, further comprising
a scissor linkage upon which the pair of sensor supports are carried, the scissor linkage shiftable between i) a first position in which the pair of sensor supports are adjacent to each other for insertion into the inside of the tire and ii) a second position in which the pair of sensor supports are spaced apart from each other in an opposing manner with each sensor positioned adjacent to the inside surface of the tire along one of the sidewalls.

8. The device for sensor placement within a tire as in claim 7, further comprising a supplementary pair of rollers supported upon the scissor linkage between the pair of sensor supports, the pair of rollers configured for contacting the inside surface of the tire along a crown region of the tire when the scissor linkage is in the second position.

9. The device for sensor placement within a tire as in claim 7, the tire defining radial and axial directions, the device further comprising a support frame upon which the scissor linkage is supported, the support frame configured for moving the scissor linkage along the radial and axial directions to insert and remove the pair of sensor supports relative to the inside of the tire.

10. The device for sensor placement within a tire as in claim 1, further comprising a pair of pivot arms, each pivot arm having a distal end and a base end, wherein the distal end of each pivot arm is rotatably connected to one of the sensor supports, the pivot arms shiftable between i) a first position in which the pair of sensor supports are adjacent to each other for insertion into the inside of the tire and ii) a second position in which the pair of sensor supports are spaced apart from each other in an opposing manner with each sensor positioned adjacent to the inside surface of the tire along one of the sidewalls.

11. The device for sensor placement within a tire as in claim 10, the tire defining radial and axial directions, the device further comprising a support frame to which the base end of each pivot arm is connected.

12. The device for sensor placement within a tire as in claim 1, further comprising means for positioning the sensor supports inside the tire with the sensor supports positioned in an opposing manner along the inside surface of the tire at the opposing side walls.

13. The device for sensor placement within a tire as in claim 1, wherein the sensor defines a longitudinal direction, and where the sensor comprises a plurality of Hall Effect sensors positioned along the longitudinal direction.

14. The device for sensor placement within a tire as in claim 1, wherein the plurality of support arms comprises a first pair of support arms and a second pair of support arms positioned adjacent to each other.

15. The device for sensor placement within a tire as in claim 1, wherein the biasing element comprises a compression spring.

16. A sensor support for placement of a sensor within a tire, the tire having an inside surface and a pair of opposing sidewalls, the sensor support comprising:
a sensor for positioning along the inside surface of the tire at one of the opposing sidewalls;
a substrate upon which the sensor is supported;
a bracket;
a plurality of support arms extending between the substrate and the bracket, each support arm having a first end that is rotatably connected with the bracket and a second end that is rotatably connected with the substrate whereby the substrate can pivot relative to the bracket;
a pair of rollers that are connected with the bracket and rotatable relative to the bracket, the rollers spaced apart from each other and positioned in an opposing manner about the bracket, the pair of rollers configured for riding along the inside surface of the tire; and
a biasing element attached with the bracket and configured for urging the substrate and sensor towards the inside surface of the tire.

17. The sensor support of claim 16, wherein the support arms define a support arm axis about which the first end of the support arms are rotatable, and wherein each roller is rotatable about a roller axis that is offset by a non-zero angle from the support arm axis.

18. The sensor support of claim 16, wherein the sensor comprises a plurality of Hall Effect sensors positioned along the longitudinal direction.

* * * * *